Jan. 5, 1926.　　　　　　　　　　　1,568,779
W. SPARKS
FAN
Filed Oct. 4, 1921

Inventor
Wm Sparks
By Denison Thompson
Attorneys

Patented Jan. 5, 1926.

1,568,779

UNITED STATES PATENT OFFICE.

WILLIAM SPARKS, OF JACKSON, MICHIGAN, ASSIGNOR TO THE SPARKS-WITHINGTON COMPANY, OF CLEVELAND, OHIO, A CORPORATION OF OHIO.

FAN.

Application filed October 4, 1921. Serial No. 505,339.

*To all whom it may concern:*

Be it known that I, WILLIAM SPARKS, a citizen of the United States, of Jackson, in the county of Jackson, in the State of Michigan, have invented new and useful Improvements in Fans, of which the following, taken in connection with the accompanying drawings, is a full, clear, and exact description.

This invention relates to certain improvements in fans.

The object of the invention is to construct a fan preferably of the plain bearing type that is effectively lubricated by a contained lubricating system, the circulation of lubricant through which is maintained by the operation of the fan.

Other objects and advantages relate to the details of construction and form of the parts, all as will more fully appear from the following description, taken in connection with the accompanying drawings, in which.

Figure 1:
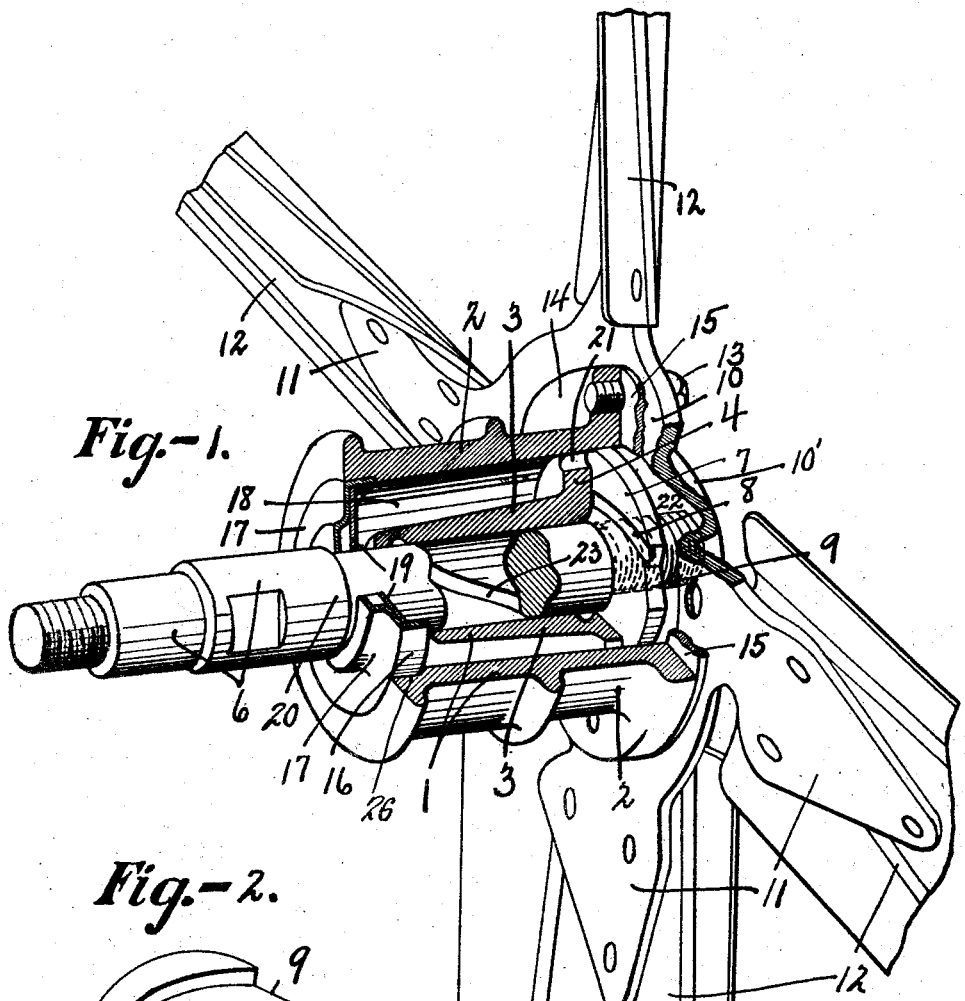
Figure 1 is an elevation partly in section.

The fan structure illustrated in the drawings comprises a casting —1— comprising a pair of substantially cylindrical concentric parts —2— and —3— connected by an integral cross wall —4— spaced a short distance from one end of the part —2—, which latter part may, as indicated, constitute the pulley portion of the fan while the part —3— constitutes the main bearing thereof. The cross wall —4— is provided with several openings or holes drilled therethrough and permitting passage of liquid from the oiling chamber —18— between the parts —2— and —3— and the forward portion of the fan structure, as hereinafter described. As stated, the part —3— constitutes the main fan bearing and its bore is preferably provided, as indicated, with a spiral groove through which oil may pass when the bearing —3— is mounted upon the shaft —6— of the fan structure.

The shaft —6— is provided with a thrust washer —7— preferably mounted thereon in a rigid manner as by means of cooperating threads of proper diameter and is near the forward positioned end of the shaft, and this thrust washer is of an external diameter slightly smaller than the internal diameter of the part —2— and is positioned within the said part —2— and has its thrust surface bearing against the cross wall —4—.

Figure 2:
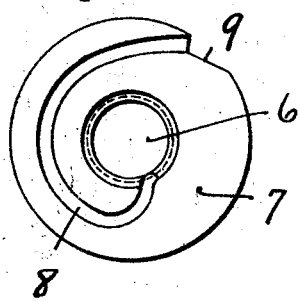
Figure 2 is an elevation of the thrust washer.

The thrust surface of the washer —7— is provided, as best shown in Figure 2, with a spiral or helical groove —8— leading from a point adjacent the shaft —6— to a notch or recess —9— in the edge of the thrust washer —7—. This notch permits communication between the groove —8— and the chamber —22— between the thrust washer —7— and the fan spider —10—. This fan spider, may, as indicated, have a forwardly off-set portion —10'— and a series of radiating arms —11— upon which arms the fan blades —12— may be mounted in any suitable manner. The fan spider —10— is connected to the casting —1— in any suitable manner, as by bolts —13— extending through the fan spider through the flange —14— upon the casting —1— and through an interposed washer —15— adapted to form an oil tight joint between the casting —1— and the fan spider —10—.

The rear end of the casting —1— is bored out at —26— for the reception of the flange —16— constituting a portion of a pressed metal cup —17— of such a diameter that the cup —17— when pressed within the bored out portion of the part —2— is frictionally held therein in desired position. This cup has a central opening through which the shaft —6— extends, and the opening is of such a diameter as to tightly encircle the shaft, preventing the escape of lubricant from the oil chamber —18—. As an additional barrier a washer —19— is provided adapted to fit tightly within the cup —17— and spaced therefrom at its inner edge due to the dished shape of cup —17— so as to form between the cup shaped member and the washer a chamber capable of receiving a ring of suitable material such as cork, should that be desirable, for any purpose, such as shipment of the article. The inner surface of the washer —19— is spaced some distance from the rear end of the bearing —3— so that all the rear end of the bearing has a clear opening into the oil chamber —18—, and can, therefore, take care of any amount of oil that may work out as the bearing becomes worn.

The thrust ahead is taken between the washer —7— and the wall —4—, while the thrust back is taken between the end of shaft —6— and the spider —10— with which the end of the shaft is at all times in substantial contact.

The operation of this structure will be readily understood. The lubricant contained in the chamber —18— flows through the openings —21— and escapes forwardly around the outer edge of the thrust washer 7 into the chamber —22— between the thrust washer —7— and the fan spider—10—. It then passes through the groove or notch —9— into the passageway comprising the spiral groove —8— one wall of which is movable and the other stationary, and then into the spiral groove —23— formed in the bore of the bearing —3—, and passes rearwardly and escapes from the rear end of the bearing into chamber —18—.

This structure effects a forced circulation of oil for the reason that in connection with both the oiling thrust washer —7— and the bearing surface —3—, one wall of the conduit through which the oil passes is stationary, the other wall being movable. This relative movement causes the oil in the conduit to move through it in the manner described.

It should be noted that with this system of lubrication not only the main bearing surface, but the thrust surface of the washer —7— is positively and effectively lubricated.

Any suitable means may be provided for filling the chamber 18, as for instance, the usual opening with a closure plug not necessary to herein further illustrate or describe, as the structure of the same constitutes no portion of this invention.

Although I have shown and described a specific construction and form of device, as illustrative of a perhaps preferred embodiment of my invention, I do not desire to limit myself to the same, as various changes, modifications and substitutions may be made without departing from the invention, as set forth in the appended claims.

I claim:

1. A fan structure comprising a shaft, an elongated bearing mounted thereon, a casing enclosing the bearing and extending beyond the bearing at its front end, a cross wall connecting the bearing to the casing at the forward end of the bearing thereby forming an annular oil chamber between the bearing and the casing, said cross-wall provided with an opening for the passage of lubricant, a thrust washer mounted on said shaft and having its thrust surface in contact with said cross wall, and a fan spider secured to the forward end of said casing and forming a second lubricant chamber between the fan spider and the thrust washer.

2. A fan structure comprising a shaft, an elongated bearing mounted thereon, a casing enclosing the bearing and extending beyond the bearing at its front end, a cross wall connecting the bearing to the casing at the forward end of the bearing thereby forming an annular oil chamber between the bearing and the casing, said cross-wall provided with an opening for the passage of lubricant, a thrust washer mounted on said shaft and having its thrust surface in contact with said cross wall, a fan spider secured to the forward end of said casing and forming a second lubricant chamber between the fan spider and the thrust washer, said thrust washer having a recess in its periphery and a groove in its thrust surface leading to the shaft.

3. A fan structure comprising a shaft, an elongated bearing mounted thereon, a casing enclosing the bearing and extending beyond the bearing at its front end, a cross wall connecting the bearing to the casing at the forward end of the bearing thereby forming an annular oil chamber between the bearing and the casing, said cross-wall provided with an opening for the passage of lubricant, a thrust washer mounted on said shaft and substantially filling the space between the shaft and the casing and having its thrust surface in contact with said cross wall, a fan spider secured to the forward end of said casing and forming a second lubricant chamber between the fan spider and the thrust washer, said thrust washer having a recess in its periphery and a groove in its thrust surface leading to the shaft, and said bearing having a spiral groove leading from the groove in said thrust washer to the rear end of the bearing and adapted to discharge lubricant into the lubricant chamber between the bearing and the casing.

4. A fan structure comprising an integral casting including a substantially cylindrical elongated bearing portion, a substantially cylindrical elongated casing portion outside of and spaced from the bearing portion, a cross-wall connecting the forward end of the bearing portion to the casing at an intermediate point along the length of the latter and having an opening therethrough for the passage of lubricant, a shaft mounted in the bearing portion, a thrust washer mounted on the shaft and having its thrust surface in contact with said cross-wall, a fan-spider secured to the forward end of said casing and spaced from the thrust washer to form a lubricant chamber.

5. A fan structure comprising an integral casting including a substantially cylindrical elongated bearing portion, a substantially cylindrical elongated casing portion outside of and spaced from the bearing portion, a cross-wall connecting the forward end of the bearing portion to the casing at in intermediate point along the length of the latter and having an opening therethrough for the passage of lubricant, a shaft mounted in the bearing portion, a thrust-washer mounted on the shaft and having its thrust surface in contact with said cross-wall, a fan-spider secured to the forward end of said casing and spaced from the thrust-washer to form a lubricant chamber, said thrust washer having a recess in its periphery, and a groove in its thrust surface leading to the shaft.

6. A fan-structure comprising an integral casting including a substantially cylindrical elongated bearing portion, a substantially cylindrical elongated casing portion outside of and spaced from the bearing portion, a cross-wall connecting the forward end of the bearing portion to the casing at an intermediate point along the length of the latter and having an opening therethrough for the passage of lubricant, a shaft mounted in the bearing portion, a thrust washer mounted on the shaft and having its thrust surface in contact with said cross-wall, a fan-spider secured to the forward end of said casing and spaced from the thrust washer to form a lubricant chamber, said thrust washer having a recess in its periphery, and a groove in its thrust surface leading to the shaft, and said bearing portion having a groove extending along its interior surface and leading from the groove in the thrust washer to the rear of the bearing portion and discharging around the rear end of the bearing portion into the lubricant chamber between the bearing portion and the casing portion.

7. A fan structure comprising a shaft, an elongated bearing mounted thereon, a casing enclosing the bearing and extending beyond the bearing at its front end, a cross-wall connecting the bearing to the casing at the forward end of the bearing, thereby forming an annular oil chamber between the bearing and the casing, said cross-wall provided with an opening for the passage of lubricant, a thrust-washer mounted on said shaft and having its thrust surface in contact with said cross-wall, a fan spider secured to the forward end of said casing and forming a second lubricant chamber between the fan-spider and the thrust-washer, said thrust-washer having a groove in its thrust surface for conveying lubricant to the shaft.

8. A fan structure comprising a shaft, an elongated bearing mounted thereon, a casing enclosing the bearing and extending beyond the bearing at its front end, a cross-wall connecting the bearing to the casing at the forward end of the bearing, thereby forming an annular oil chamber between the bearing and the casing, said cross-wall provided with an opening for the passage of lubricant, a thrust-washer mounted on said shaft and having its thrust surface in contact with said cross-wall, a fan spider secured to the forward end of said casing and forming a second lubricant chamber between the fan spider and the thrust washer, said thrust washer having a recess in its periphery and a groove in its thrust surface leading to the shaft.

9. A fan structure comprising an integral casting including a substantially cylindrical elongated bearing portion, a substantially cylindrical elongated casing portion outside of and spaced from the bearing portion, a cross-wall connecting the forward end of the bearing portion to the casing at an intermediate point along the length of the latter, a shaft mounted in the bearing portion, a thrust-washer mounted on said shaft and having its thrust surface in contact with said cross-wall, a fan spider secured to the forward end of said casing and spaced from the thrust washer to form a lubricant-chamber between the thrust-washer and the fan spider, said thrust-washer having a groove in its thrust surface for conveying lubricant to the shaft.

10. A fan structure comprising a shaft, an elongated bearing mounted thereon, a casing enclosing the bearing and extending beyond the bearing at its front end and connected to the bearing for simultaneous rotation, an annular cross wall extending from the forward end of the bearing radially outwardly to the casing, thereby forming an annular oil chamber between the bearing and the casing, said cross wall provided with an opening for the passage of lubricant, a thrust washer mounted on said shaft and having its thrust surface in contact with the said cross wall, and a fan spider secured to the forward end of said casing and spaced from the thrust washer to form a second lubricant chamber between the fan spider and the thrust washer.

11. A fan structure comprising a shaft, an elongated bearing mounted thereon, a casing enclosing the bearing and extending beyond the bearing at its front end and connected to the bearing for simultaneous rotation, an annular cross wall extending from the forward end of the bearing radially outwardly to the casing, thereby forming an annular oil chamber between the bearing and the casing, said cross wall provided with an opening for the passage of lubricant, a thrust washer mounted on said shaft and having its thrust surface in contact with the said cross wall, a fan spider secured to the forward end of said casing and said thrust washer having a recess in its periphery and a groove in its thrust surface for supplying lubricant to the shaft.

12. A fan structure comprising a shaft, an elongated bearing mounted thereon, a casing enclosing the bearing and extending beyond the bearing at its front end and connected to the bearing for simultaneous rotation, an annular cross wall extending from the forward end of the bearing radially outwardly to the casing, thereby forming an annular oil chamber between the bearing and the casing, said cross wall provided with an opening for the passage of lubricant, a thrust washer mounted on said shaft and having its thrust surface in contact with the said cross wall, a fan spider secured to the forward end of said casing and said thrust washer having a recess in its periphery and a passageway leading from said recess to the shaft for supplying lubricant to the shaft.

In witness whereof I have hereunto set my hand this 28th day of September, 1921.

WILLIAM SPARKS.